United States Patent
Trippi et al.

(10) Patent No.: US 10,228,970 B2
(45) Date of Patent: Mar. 12, 2019

(54) DOMAIN BOUNDING FOR SYMMETRIC MULTIPROCESSING SYSTEMS

(71) Applicant: Mentor Graphics Corporation, Wilsonville, OR (US)

(72) Inventors: Michael Trippi, Mobile, AL (US); Arvind Raghuraman, Mobile, AL (US); Daniel Driscoll, Mobile, AL (US)

(73) Assignee: MENTOR GRAPHICS CORPORATION, Wilsonville, OR (US)

( * ) Notice: Subject to any disclaimer, the term of this patent is extended or adjusted under 35 U.S.C. 154(b) by 435 days.

(21) Appl. No.: 14/949,842

(22) Filed: Nov. 23, 2015

(65) Prior Publication Data
US 2016/0217006 A1    Jul. 28, 2016

Related U.S. Application Data

(63) Continuation of application No. 13/771,059, filed on Feb. 19, 2013, which is a continuation of application No. 12/815,299, filed on Jun. 14, 2010.
(Continued)

(51) Int. Cl.
*G06F 9/455* (2018.01)
*G06F 9/48* (2006.01)
(Continued)

(52) U.S. Cl.
CPC .......... *G06F 9/4881* (2013.01); *G06F 9/5033* (2013.01); *G06F 9/5088* (2013.01);
(Continued)

(58) Field of Classification Search
CPC ............ G06F 1/00–21/00; G06Q 10/00–99/00
(Continued)

(56) References Cited

U.S. PATENT DOCUMENTS

| | | | | |
|---|---|---|---|---|
| 5,109,512 A | * | 4/1992 | Bahr ...................... | G06F 9/5033 718/103 |
| 5,459,864 A | * | 10/1995 | Brent ...................... | G06F 9/505 713/100 |

(Continued)

OTHER PUBLICATIONS

Kwok, Yu-Kwong, and Ishfaq Ahmad. "Static scheduling algorithms for allocating directed task graphs to multiprocessors." ACM Computing Surveys (CSUR) 31.4 (1999): 406-471. (Year: 1999).*
(Continued)

*Primary Examiner* — Alan S Miller

(57) ABSTRACT

Methods and apparatuses for bounding the processing domain in a symmetric multiprocessing system are provided. In various implementations, a particular computational task is "affined" to a particular processing unit. Subsequently, when the particular task is executed, the symmetric multiprocessing operating system ensures that the affined processing unit processes the instruction. When the affined processing unit is not processing the particular computational task, the symmetric multiprocessing operating system may cause the processing unit to process alternate instructions. With some implementations, a particular computational task is "linked" to a particular processing unit. Subsequently, when the particular task is executed, the symmetric multiprocessing operating system ensures that the bound processing unit processes the instruction. When the bound processing unit is not processing the particular computational instruction, the bound processing unit may enter a low power or idle state.

18 Claims, 7 Drawing Sheets

Related U.S. Application Data

(60) Provisional application No. 61/186,760, filed on Jun. 12, 2009.

(51) Int. Cl.
  *G06F 9/54* (2006.01)
  *G06F 9/50* (2006.01)

(52) U.S. Cl.
  CPC ............. *G06F 9/54* (2013.01); *Y02D 10/22* (2018.01); *Y02D 10/24* (2018.01)

(58) Field of Classification Search
  USPC ............................................ 718/1, 101–108
  See application file for complete search history.

(56) References Cited

U.S. PATENT DOCUMENTS

| | | | | |
|---|---|---|---|---|
| 5,566,349 A * | 10/1996 | Trout | .................. | G06F 15/173 710/20 |
| 6,289,369 B1 * | 9/2001 | Sundaresan | ........... | G06F 9/5033 718/100 |
| 6,427,161 B1 * | 7/2002 | LiVecchi | ............... | G06F 9/4881 718/102 |
| 6,480,876 B2 * | 11/2002 | Rehg | .................... | G06F 9/5066 709/231 |
| 6,728,959 B1 * | 4/2004 | Merkey | ................. | G06F 9/5033 718/100 |
| 6,785,774 B2 * | 8/2004 | Arimilli | .............. | G06F 12/0831 711/118 |
| 6,993,762 B1 * | 1/2006 | Pierre | ................... | G06F 9/5066 718/100 |
| 7,318,126 B2 * | 1/2008 | Finkler | ................ | G06F 9/5016 711/141 |
| 7,464,380 B1 * | 12/2008 | Hempel | ................ | G06F 9/5033 709/231 |
| 7,475,195 B2 * | 1/2009 | Clark | .................. | G06F 12/0817 711/141 |
| 7,774,555 B2 * | 8/2010 | Fields, Jr. | ............ | G06F 12/0831 711/119 |
| 7,913,257 B2 * | 3/2011 | Nishikawa | ............ | G06F 9/5066 718/102 |
| 2003/0018691 A1 * | 1/2003 | Bono | .................... | G06F 9/4881 718/106 |
| 2004/0117793 A1 * | 6/2004 | Shaylor | ................. | G06F 9/4856 718/100 |
| 2005/0273571 A1 * | 12/2005 | Lyon | .................... | G06F 9/45537 711/203 |
| 2006/0168571 A1 * | 7/2006 | Ghiasi | .................... | G06F 9/505 717/127 |
| 2007/0011646 A1 * | 1/2007 | Chrisochoides | ........ | G06T 17/20 716/55 |
| 2008/0177756 A1 * | 7/2008 | Kosche | ............... | G06F 11/3447 |
| 2009/0132769 A1 * | 5/2009 | Pronovost | ............. | G06F 12/122 711/145 |
| 2009/0187713 A1 * | 7/2009 | Zedlewski | .......... | G06F 11/3409 711/130 |
| 2011/0041131 A1 * | 2/2011 | Srivatsa | ................ | G06F 9/4812 718/102 |

OTHER PUBLICATIONS

Dandamudi, Sivarama P., and Philip S. P. Cheng. "A hierarchical task queue organization for shared-memory multiprocessor systems." IEEE Transactions on Parallel and Distributed Systems 6.1 (1995): 1-16. (Year: 1995).*

Gai, Paolo, et al. "A comparison of MPCP and MSRP when sharing resources in the Janus multiple-processor on a chip platform." Real-Time and Embedded Technology and Applications Symposium, 2003. Proceedings. The 9th IEEE. IEEE, 2003. (Year: 2003).*

Dandamudi, Sivarama P. "Reducing run queue contention in shared memory multiprocessors." Computer 3 (1997): 82-89. (Year: 1997).*

* cited by examiner

DOMAIN BOUNDING FOR SYMMETRIC MULTIPROCESSING SYSTEMS

RELATED APPLICATIONS

This application is a continuation of U.S. patent application Ser. No. 13/771,059, filed on Feb. 19, 2013, entitled "Domain Bounding For Symmetric Multiprocessing Systems" and naming Arvind Raghuraman et al. as inventors, which application in turn is a continuation of U.S. patent application Ser. No. 12/815,299, filed on Jun. 14, 2010, now abandoned, entitled "Domain Bounding For Symmetric Multiprocessing Systems" and naming Arvind Raghuraman et al. as inventors, which application in turn claimed priority under 35 U.S.C. § 119 to U.S. Provisional Patent Application No. 61/186,760, filed on Jun. 12, 2009, entitled "Domain Bounding For Symmetric Multiprocessing Systems," and naming Arvind Raghuraman et al. as inventors, each of which applications is incorporated entirely herein by reference.

FIELD OF THE INVENTION

The invention relates to the field of computing on multi-processor computer architectures. More particularly, various implementations of the invention are applicable to bounding the processing domains for a multi-processor embedded system.

BACKGROUND OF THE INVENTION

An embedded system may be described as a special purpose computing system designed to perform one or a few dedicated functions. Embedded systems are commonly used in consumer devices like personal digital assistants, mobile phones, videogame consoles, microwaves, washing machines, alarm systems, and digital cameras. In addition to the consumer space, embedded systems are used in nearly every industry, from telecommunications to manufacturing, and from transportation to medical devices. In fact, embedded systems are so commonly in use today that it is not feasible to exhaustively list specific examples.

The term "embedded system" does not have a precise definition, and determining what is and is not an embedded system can be difficult. For example, a general purpose computer, such as a laptop, is not typically characterized as an embedded system. However, a laptop is usually composed of a multitude of subsystems such as the hard disk drive, the motherboard, the optical drive, the video processing unit, and various communication devices. Many of the individual subsystems comprising the laptop may themselves be embedded systems.

The complexity of embedded systems can vary from, for example, systems with a single microcontroller chip and a light emitting diode to systems with multiple microprocessor units and various peripheral communication interfaces and mechanical parts. Manufacturers of modern microprocessors are increasingly adding components and peripheral modules to their microprocessors, creating what may be thought of as embedded processors. This type of embedded system is often referred to as a system on a chip (SoC). A simple example of a system on chip is an application-specific integrated circuit (ASIC) packaged with a universal serial bus (USB) port. Additionally, embedded systems range from those having no user interface at all to those with full user interfaces similar to a desktop operating system.

There are many advantages to using embedded systems. For example, an embedded system typically is designed to do some specific task, as opposed to being a general purpose computer with a wide range of features for performing many different tasks. As a result, design engineers can optimize the embedded system for the desired task, which assists in reducing the size and cost of the device as well as increasing its reliability and performance.

Symmetric Multiprocessing

As stated above, embedded systems may often contain more than one processing unit. Embedded systems having more than one processing unit are often referred to as a multiprocessor system. In general, a multiprocessor computer system is any computing configuration that utilizes more than one processing unit. The processing units will typically share a memory. Additionally, one operating system is often used to control the entire system. In this type of arrangement, multiple computational tasks, or "instructions," may be processed at the same time, such as, for example, one by each processing unit. This type of computing arrangement (i.e. where multiple processing units share a memory and are controlled by a single instance of an operating system) is often referred to as "symmetric multiprocessing" or SMP.

As indicated, an operating system is used to control the symmetric multiprocessing system. Controlling which processing units perform which tasks and when, is managed by the operating system, which typically operates on one of the processing units in the system. This operating system is often referred to as an SMP operating system or a symmetric multiprocessing operating system. As those of skill in the art can appreciate, various symmetric multiprocessing operating systems currently exist. For example, OS X, Linux, and various Unix based operating systems are all capable of operating in a symmetric multiprocessing environment. Typically, a symmetric multiprocessing operating system allows any processor to work on any task, no matter the type of task or where the data for that task is located. Additionally, many symmetric multiprocessing operating systems move tasks between processors to balance the workload efficiently.

This type of task balancing and workload sharing may however, in some cases, be disadvantageous. This is particularly true in an embedded system where hardware and power constraints may dictate that particular processing units be employed to perform a particular type of task or operate on data located in a specific location.

SUMMARY OF THE INVENTION

Various implementations of the present invention provide methods and apparatuses for bounding the processing domain in a symmetric multiprocessing system. In various implementations, a particular computational task is "affined" to a particular processing unit. Subsequently, when the particular task is executed, the symmetric multiprocessing operating system ensures that the affined processing unit processes the instruction. When the affined processing unit is not processing the particular computational task, the symmetric multiprocessing operating system may cause the processing unit to process alternate instructions. With some implementations, a particular computational task is "linked" to a particular processing unit. Subsequently, when the particular task is executed, the symmetric multiprocessing operating system ensures that the bound processing unit processes the instruction. When the bound processing unit is not processing the particular computational instruction, the bound processing unit may enter a low power or idle state.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE IMPLEMENTATIONS

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms like "determine" to describe the disclosed methods. Such terms are often high-level abstractions of the actual operations that are performed. The actual operations that correspond to these terms will often vary depending on the particular implementation, and will be readily discernible by one of ordinary skill in the art.

The methods described herein can be implemented by software stored on a computer readable storage medium and executed on a computer. Furthermore, the selected methods could be executed on a single computer or a computer networked with another computer or computers. For clarity, only those aspects of the software germane to these disclosed methods are described; product details well known in the art are omitted.

Illustrative Computing Environment

As the techniques of the present invention may be implemented using software instructions executed by one or more programmable computing devices, the components and operation of a generic programmable computer system on which various implementations of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

Figure 1:
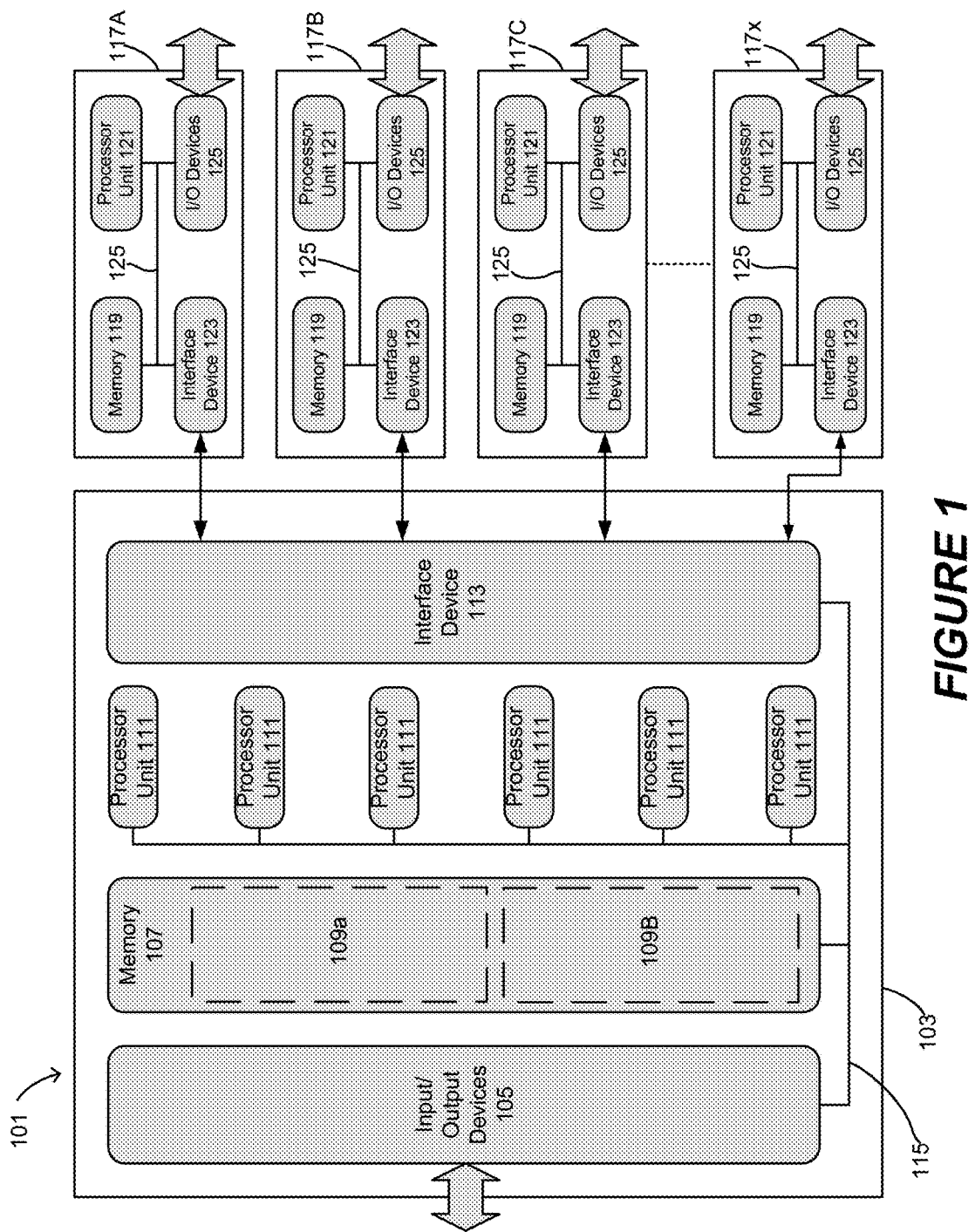
FIG. 1 shows an illustrative computing environment.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
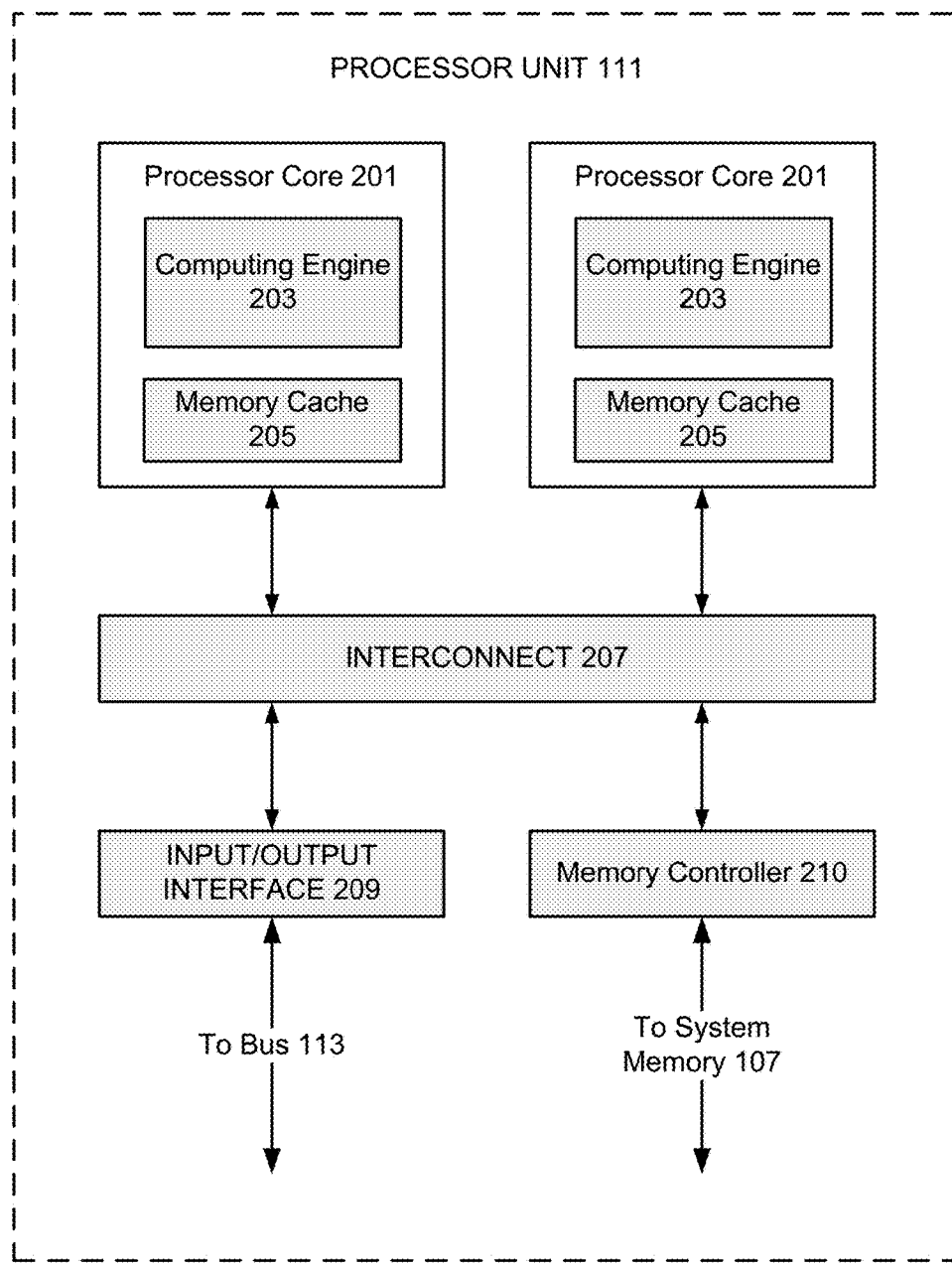
FIG. 2 shows a portion of the illustrative computing environment of FIG. 1 in greater detail.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

Furthermore, it is to be appreciated, that although in the example, the master computer 103 and the slave computers 117 are shows as individual discrete units, some implementations may package the master computers 103 and the slave computers 117 into a single unit, such as, for example, a System-on-Chip device.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Symmetric Multiprocessing Systems

Figure 3:
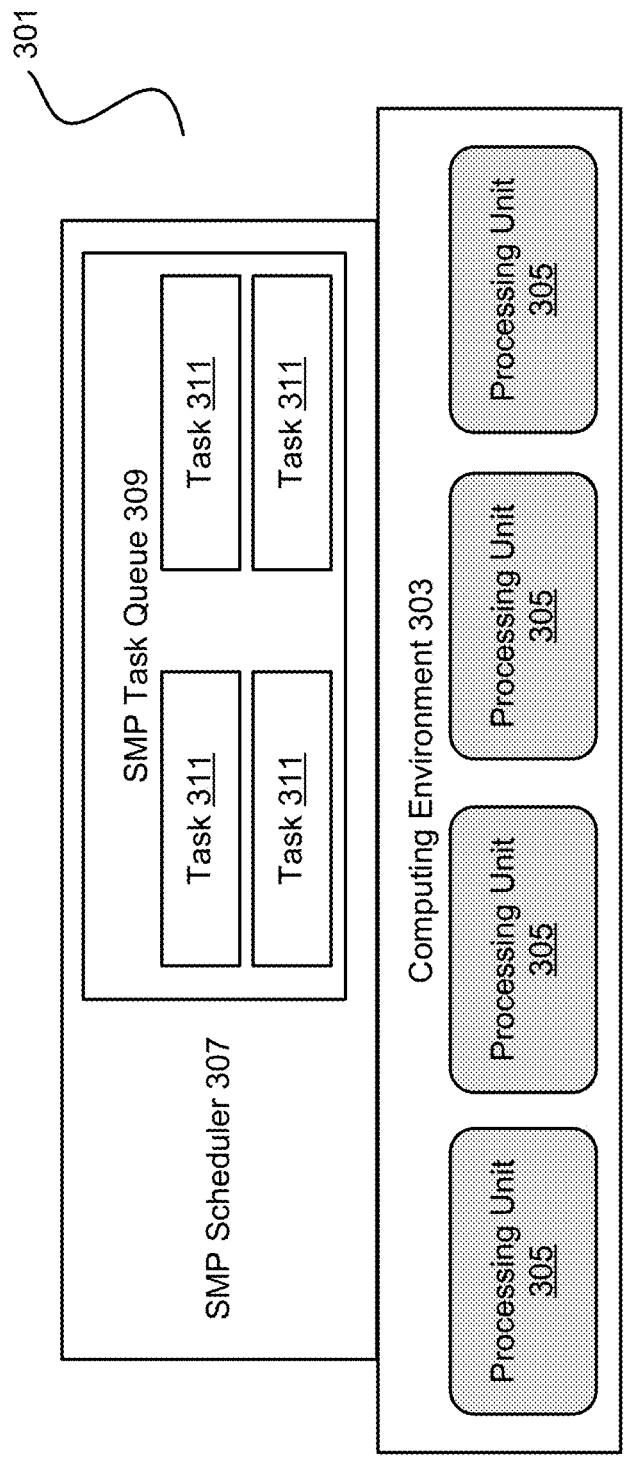
FIG. 3 illustrates a conventional symmetric multiprocessing system.

As indicated above, a conventional symmetric multiprocessing system includes a plurality of processing units, capable of independently executing various tasks. For example, FIG. 3 illustrates a conventional symmetric multiprocessing system 301. As can be seen from this figure, the system 301 includes a computing environment 303, including processing units 305. In various implementations of the invention, the computing environment 303 may be formed by the computer network 101 of FIG. 1. As such, the processing units 305 would comprise the processor units 111 and 121 shown in the figure. With some implementations, the computing environment 303 may be formed by the master computer 103. Accordingly, the processing units 305 would comprise the processor units 111. As can be appreciated, various components of the computing environment 303 are not shown in this example. For example, the computing environment 303 would likely include a memory component, which is some cases, may be implemented by the memory 107 shown in FIG. 1.

The system 301 also includes a symmetric multiprocessing scheduler 307 having a symmetric multiprocessing queue 309. Furthermore, as can be seen, the symmetric multiprocessing queue 309 includes tasks 311. As detailed above, in a conventional symmetric multiprocessing system, any of the tasks 311 may be executed on any of the processing units 305. The symmetric multiprocessing scheduler 307 may assign particular tasks 311 to any of the processing units 305, and may change or move the assignments dynamically to balance the computational load efficiently.

However, as indicated above, this has some disadvantageous. One such disadvantage is that processing units 305 are increasingly more specific to particular tasks 311. This is often the case in embedded systems, where a particular processing unit may have been designed for a specific function, such as, for example, video encoding. Additionally, ones of the processing units 305 may have much higher power consumption needs than other ones of the processing units 305. As such, use of these processing units 305 could be better controlled to manage power consumption for the system 301.

Domain Bounding for Symmetric Multiprocessing Systems

As used herein, a processing unit 305 may be either a microprocessor or a core within a multi-core microprocessor, such as, for example, the processor unit 111 and the processor core 201 respectively. Furthermore, applicants would like to point out that although in practice, a distinction between a symmetric computing architecture (i.e. homogenous processing units that share memory) and an asymmetric computing architecture (i.e. heterogeneous processing units that share memory) may be made; herein, when referencing a symmetric multiprocessing system, not all processing units must be homogenous. For example, as used herein, a symmetric multiprocessing system may have a combination of single core microprocessors and multi-core microprocessors. Furthermore, the microprocessors may have different hardware specifications. Still, further, the microprocessors may have different computer processor architectures.

Figure 4:
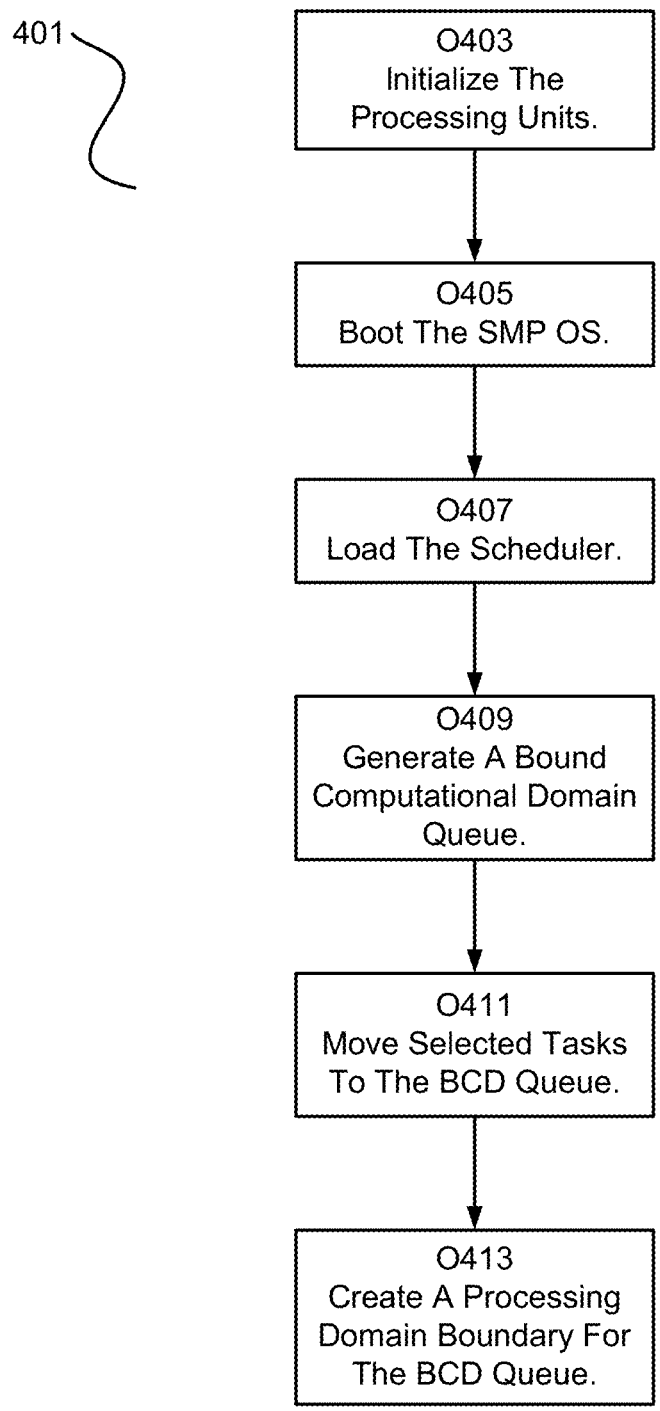
FIG. 4 illustrates a method of bounding the processing domain of a symmetric multiprocessing system.

FIG. 4 illustrates a method 401 for bounding the processing domain of a symmetric multiprocessing system. For example, the method 401 may be implemented in conjunction with the example symmetric multiprocessing system 501 shown in FIG. 5. As can be seen from these figures, the symmetric multiprocessing system 501 includes, among other items, a computing environment 503 having processing units 505. In various implementations, the symmetric multiprocessing system 501 may be formed by modifying the symmetric multiprocessing system 301 shown in FIG. 3. Still, in some implementations, the symmetric multiprocessing system 501 may be formed by utilizing the computing network 101, or alternatively, from the master computer 103 as the computing environment 503.

Returning to FIG. 4, the method 401 includes an operation 403 for initializing the processing units 505 within the symmetric multiprocessing system 501 and an operation 405 for booting a symmetric multiprocessing operating system 507 on one or more of the processing units 503. As shown in this Figure, the symmetric multiprocessing operating system 507 is booted onto the processing unit 505$i$. The processing unit 505 that loads the operating system (e.g. the processing unit 505$i$ in this example) is often referred to as the "boot processor." In various implementations of the invention, the boot processor is used exclusively by the symmetric multiprocessing operating system 507 for operations related to managing the symmetric multiprocessing system 501. In alternative implementations, the boot processor is used to load the operating system, but is not used exclusively for operations related to managing the symmetric multiprocessing system 501. Accordingly, in some implementations, the boot processor is available for general computing tasks unrelated to operating system management. With some implementations of the invention, the operation 403 initializes all the processing units 505. With alternative implementations, the operation 403 initializes only the boot processor.

The method 401 further includes an operation 407 for loading the scheduler 509. As can be seen from FIG. 5, the scheduler 509 includes a symmetric multiprocessing queue 511. As can be further seen from this figure, the system 501 additionally includes a user application 515 having tasks 517. As used herein, the tasks 517 may be explicit instructions that processing units 505 may directly execute. Alternatively, the tasks 517 may be higher level operations that the symmetric multiprocessing operating system 507 will translate into instructions that the processor units 505 may execute.

Figure 5:
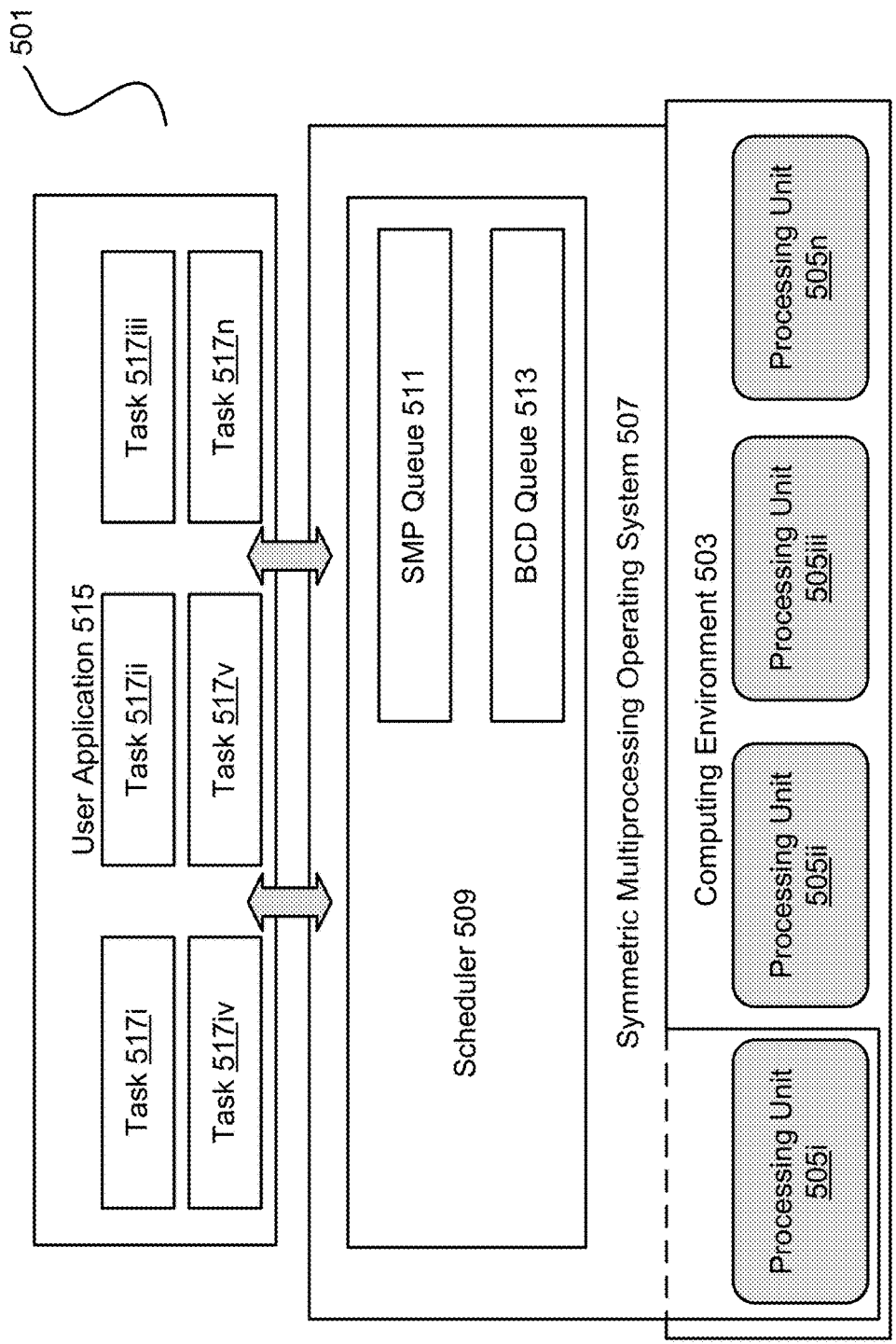
FIG. 5 illustrates a symmetric multiprocessing system according to various implementations of the present invention.

Although FIG. 5 illustrates a single user application 515, and one set of tasks 517, in various implementations, more than one user application 515 may be executed by the symmetric multiprocessing operating system 507. Additionally, in some implementations, the user application 515 may have multiple sets of tasks 517. Further still, as can be appreciated by those of skill in the art, the set of tasks 517 is typically not static. More particularly, the set of tasks 517 changes as the user application is executed.

The method 401 additionally includes an operation 409 for generating a bound computational domain queue 513 and an operation 411 for moving selected tasks 517 to the bound computational domain queue 513. In various implementations of the invention, as a user application 515 is loaded by the symmetric multiprocessing operating system 509 and tasks 517 associated with the user application 515 are identified, all the tasks 517 may be initially loaded into the symmetric multiprocessing queue 511. More particularly, when the scheduler 509 is first loaded by the operation 407, the scheduler may only include the symmetric multiprocessing queue 511, which will include all of the tasks 517.

In various implementations of the invention, the operation 409 and the operation 411 are performed as a result of some user input. With some implementations, the operation 409 and the operation 411 are triggered without user input, such as, for example, based upon the type of user application 515 or the type of task 517. In various implementations of the invention, the operations 409 and 411 may be repeated a number of times, resulting in more than one bound computational domain queue 513 being created within the scheduler 509.

The method 401 further includes an operation 413 for forming a processing domain boundary for the bound computational domain queue 513. As stated above, in various implementations, an "affinity" is created between a bound computational domain queue 513 and one or more processing units 505. Alternatively, a "link" is created between a bound computational domain queue 513 and one or more processing units 505. These example processing domain boundaries are discussed in greater detail below.

Bound Computational Domain with Affinity

In various implementations, the operation 413 "affines" one or more of the processing units 505 to the bound computational domain queue 513. Tasks 517 included in a bound computational domain queue 513 that is "affined" to a particular processing unit 505 are said to be affined to that particular processing unit 505. Tasks 517 that are affined to a particular processing unit 505 are given "priority" by the scheduler 509 to execute on that particular processing unit 505. However, when tasks 517 having an affinity for the selected processing unit 505 are not being executed, the processing unit 505 is available for scheduling non-affined tasks 517 by the scheduler 509. Priority of execution may be shown by the scheduler 509 by transferring execution of non-affined tasks 517 to idle processing units 505 when affined tasks 517 need to be executed. Alternatively, priority may be shown by stalling execution of the affined task 517 until the affined processing unit 505 is available for executing tasks 517.

Figure 6:
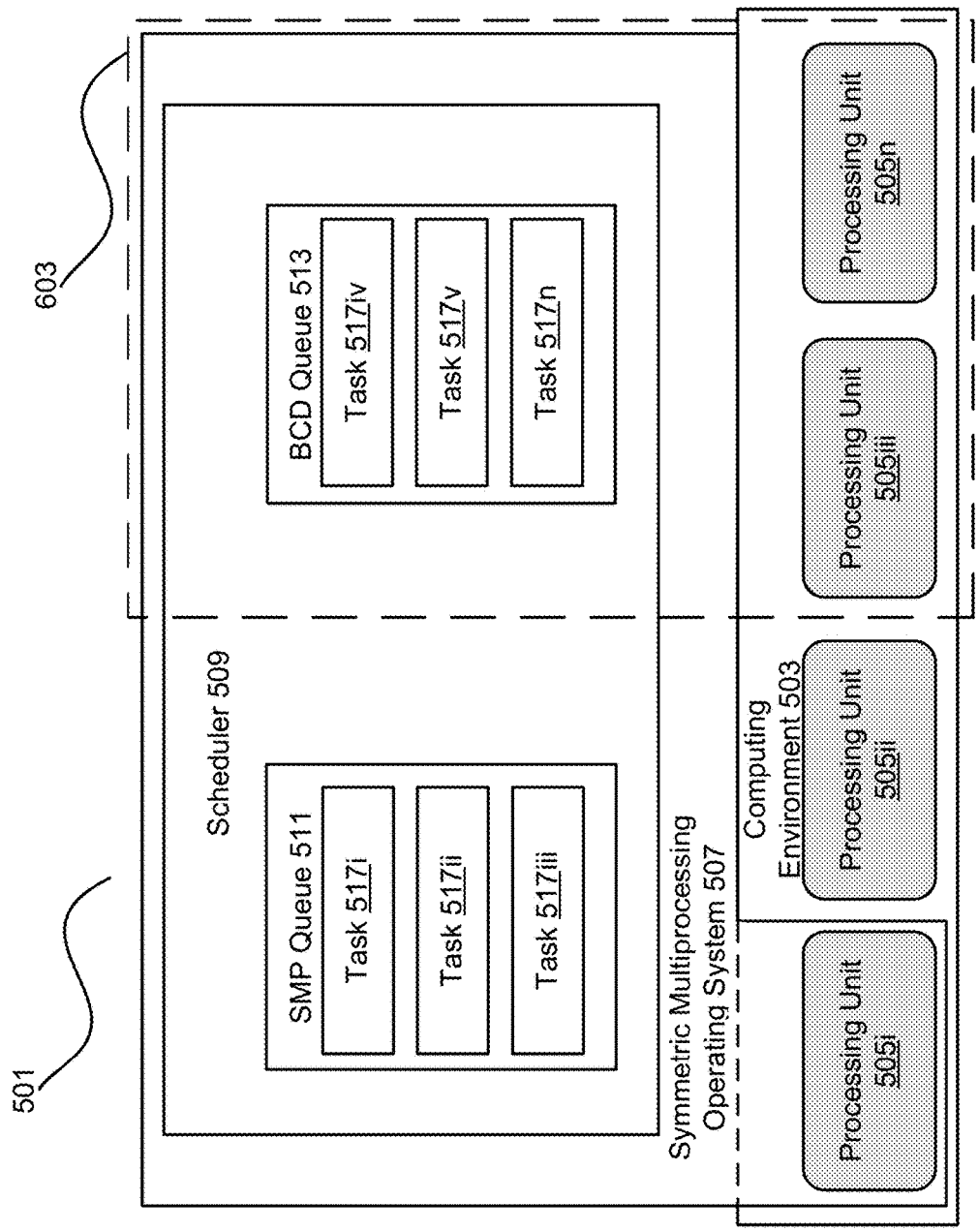
FIG. 6 illustrates the symmetric multiprocessing system of FIG. 5 in alternate detail.

In some implementations, a single processing unit 505 is affined to a bound computational domain queue 513 by the operations 413. With some implementations, multiple processing units 505 are affined to a bound computational domain queue 513. For example, FIG. 6 illustrates the symmetric multiprocessing system 501 of FIG. 5, where the bound computational domain queue 513 has been affined to the processing unit 505$iii$ and the processing unit 505$n$, as illustrated by the boundary 603. As can be seen from this figure, the user application 515 is not shown. However, the tasks 517 from the user application 515 have been moved into the symmetric multiprocessing queue 511 and the bound computational domain queue 513.

As a result of the affinity created by the operation 415 (as illustrated by the boundary 603) the scheduler 509 may assign the tasks 517$iv$, 517$v$, and 517$n$ to execute on either of the processing units 505$iii$ or 505$n$. Additionally, the scheduler 509 may assign the tasks 517$i$, 517$ii$, or 517$iii$ to execute on the processing unit 505$ii$. Alternatively, if the processing unit 505$iii$ is not executing tasks 517 from the bound computational domain queue 513, tasks 517 from the symmetric multiprocessing queue 511 may be executed on the processing unit 505$iii$. Alternatively still, if the processing unit 505$n$ is not executing tasks 517 from the bound computational domain queue 513, tasks 517 from the symmetric multiprocessing queue 511 may be executed on the processing unit 505$n$.

Bound Computational Domain with Link

As stated above, with some implementations, the operation 413 may "link" one or more the processing units 505 to a bound computational domain queue 513. Processing units 505 that have been linked to a particular task 517 or set of tasks 517 can only execute those tasks 517. When there are no linked tasks to execute, the processor remains idle, as opposed to becoming available for scheduling as in the case of an affined processing unit 505.

Figure 7:
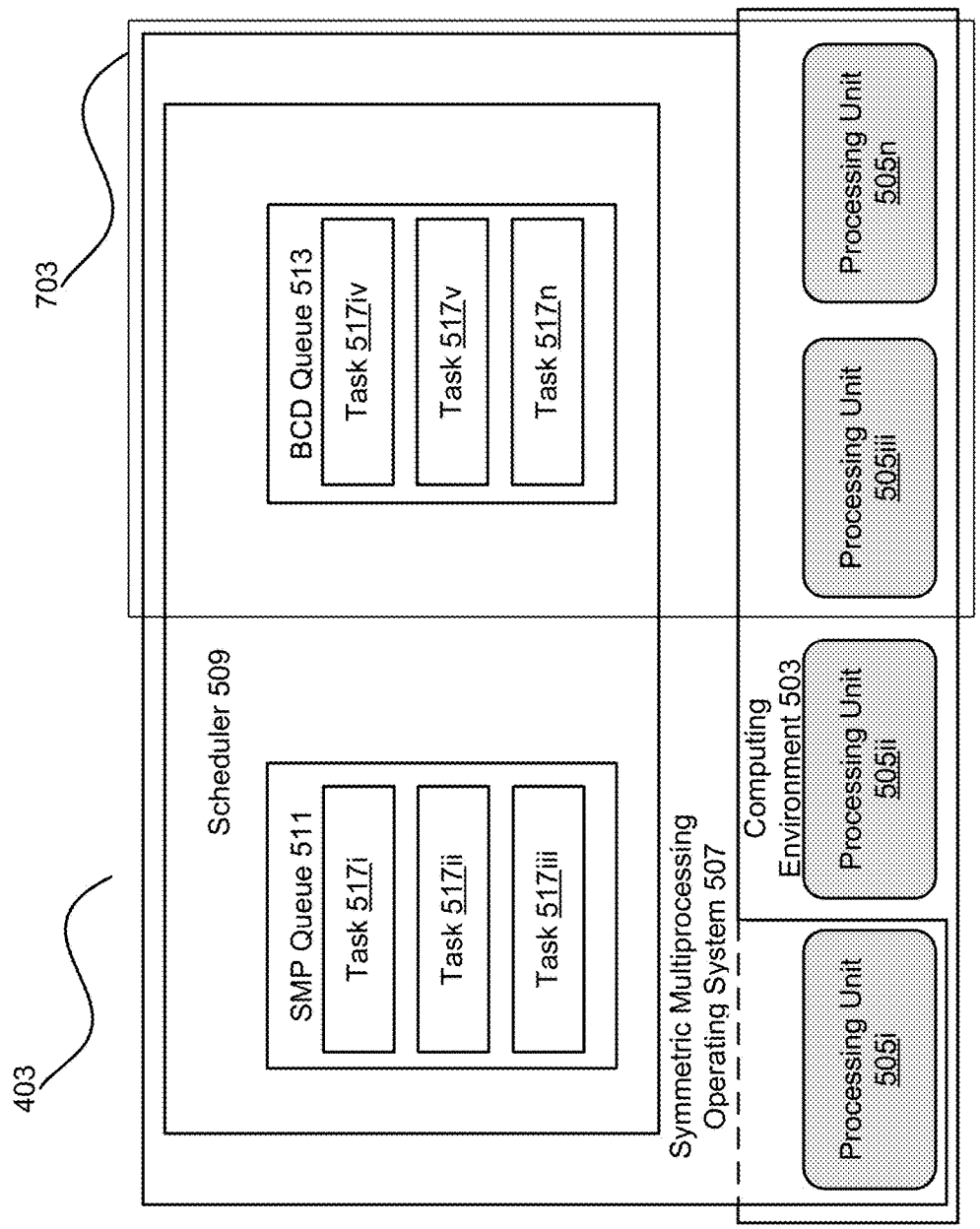
FIG. 7 illustrates the symmetric multiprocessing system of FIG. 5 in alternate detail.

FIG. 7 illustrates the symmetric multiprocessing system 501 shown in FIG. 5 and FIG. 6. However, FIG. 7 includes a boundary 703 that shows a link, as opposed to an affinity as shown by the boundary 603 in FIG. 6. As can be seen from FIG. 7, boundary 603 isolates the processing units 505$iii$ or 505$n$ to the bound computational domain 513. As a result, only the tasks 517$iv$, 517$v$, and 517$n$ may be executed by the processing units 505$iii$ and 505$n$.

In various implementations, as opposed to bounding a queue of tasks 517, such as, for example, the bounded computational domain queue 513, as described above, the processing domain for individual tasks 517 may be bound. For example, the operation 415 may directly affine the task 517$v$ with the processing unit 505$iii$. As opposed to including the task 517$v$ into a bound computational domain queue 513 and then bounding the processing domain for the queue 513.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A computer-implemented method for bounding the processing domain in a symmetric multiprocessing system, the method comprising:
    identifying a symmetric multiprocessing system, the symmetric multiprocessing system including a plurality of processing units;
    identifying a plurality of tasks to be scheduled for execution by the symmetric multiprocessing system;
    initially loading all of the plurality of tasks to be scheduled into a symmetric multiprocessing task queue;
    forming a computationally bound task queue;
    moving selected ones of the plurality of tasks to be scheduled to the computationally bound task queue;
    bounding the processing domain for the computationally bound task queue, the method act for bounding comprising linking the computationally bound task queue to a linked subset of the plurality of processing units such that the linked subset of the plurality of processing units only executes tasks moved to the computationally bound task queue and does not execute other tasks that have not been moved to the computationally bound task queue;

assigning tasks in the computationally bound task queue to execute on processing units in the processing domain bounded for the computationally bound task queue; and assigning tasks in the symmetric multiprocessing task queue to execute on processing units not in the processing domain bounded for the computationally bound task queue.

2. The computer-implemented method recited in claim 1, further comprising:

causing a symmetric multiprocessing operation system to boot onto a one of the plurality of processing units.

3. The computer-implemented method recited in claim 1, further comprising:

loading a symmetric multiprocessing operating system scheduler.

4. The computer-implemented method recited in claim 3, the method act for identifying a plurality of tasks to be scheduled for execution by the symmetric multiprocessing system comprising:

identifying a symmetric multiprocessing task queue within the symmetric multiprocessing operating system scheduler;

identifying a plurality of tasks within the symmetric multiprocessing task queue; and designating the identified tasks as the plurality of tasks to be scheduled.

5. The computer-implemented method recited in claim 1, the method act of forming a computationally bound task queue comprising:

receiving an instruction from a user of the symmetric multiprocessing system to create a bound computational domain; and forming a task queue within a symmetric multiprocessing operating system scheduler to represent the computationally bound tasks queue.

6. The computer-implemented method recited in claim 5, the instruction including a listing of one or more of the plurality of tasks to be scheduled and the method act of moving selected ones of the plurality of tasks to be scheduled to the computationally bound task queue comprising:

adding the one or more of the plurality of tasks to be scheduled listed in the instruction to the computationally bound task queue; and removing the one or more of the plurality of tasks to be scheduled listed in the instruction from the symmetric multiprocessing task queue.

7. The computer-implemented method recited in claim 5, the instruction including a listing of one or more of the plurality of processing units and the method act of bounding the processing domain for the computationally bound task queue comprising identifying the subset of the plurality of processing units to link to the computationally bound task queue as the one or more of the plurality of processing units listed in the instruction.

8. The computer-implemented method recited in claim 1, further comprising:

forming a second computationally bound task queue;

moving selected ones of the plurality of tasks to the second computationally bound task queue; and bounding the processing domain for the second computationally bound task queue, the method act for bounding the processing domain for the second computationally bound task queue comprising affining the second computationally bound task queue to a second linked subset of the plurality of processing units such that the second linked subset of the plurality of processing units executes both tasks moved to the computationally bound task queue as well as other tasks that have not been moved to the computationally bound task queue.

9. The computer-implemented method recited in claim 1, further comprising:

unbouding the computationally bound task queue; and removing the computationally bound task queue from the symmetric multiprocessing system.

10. One or more non-transitory computer-readable media, having computer executable instructions for bounding the processing domain in a symmetric multiprocessing system stored thereon, the computer executable instructions executable to cause a computer to:

identify a symmetric multiprocessing system, the symmetric multiprocessing system including a plurality of processing units;

identify a plurality of tasks to be scheduled for execution by the symmetric multiprocessing system;

initially load all of the plurality of tasks to be scheduled into a symmetric multiprocessing task queue;

form a computationally bound task queue;

move selected ones of the plurality of tasks to be scheduled from the symmetric multiprocessing task queue to the computationally bound task queue; and bound the processing domain for the computationally bound task queue;

assign tasks in the computationally bound task queue to execute on processing units in the processing domain bounded for the computationally bound task queue; and assign tasks in the symmetric multiprocessing task queue to execute on processing units not in the processing domain bounded for the computationally bound task queue.

11. The one or more non-transitory computer-readable media recited in claim 10, the computer executable instructions executable to cause the computer to form a computationally bound task queue comprising computer executable instructions to:

receive an instruction from a user of the symmetric multiprocessing system to create a bound computational domain; and form a task queue within the symmetric multiprocessing operating system scheduler to represent the computationally bound task queue.

12. The one or more non-transitory computer-readable media recited in claim 11, the instruction including a listing of one or more of the plurality of tasks to be scheduled and the computer-executable instructions executable to cause the computer to move selected ones of the plurality of tasks to be scheduled from the symmetric multiprocessing task queue to the computationally bound task queue comprising computer executable instructions to:

add the one or more of the plurality of tasks to be scheduled listed in the instruction to the computationally bound task queue; and remove the one or more of the plurality of tasks to be scheduled listed in the instruction from the symmetric multiprocessing task queue.

13. The one or more non-transitory computer-readable media recited in claim 11, the instruction including a listing of one or more of the plurality processing units and the computer-executable instructions executable to cause the computer to bound the processing domain for the computationally bound task queue comprising computer executable instructions to affine the computationally bound task queue to the one or more of the plurality of processing units listed in the instruction.

14. The one or more non-transitory computer-readable media recited in claim 11, the instruction including a listing of one or more of the plurality processing units and the computer-executable instructions executable to cause the computer to bound the processing domain for the computationally bound task queue comprising computer executable instructions to link the computationally bound task queue to the one or more of the plurality of processing units listed in the instruction such that the one or more of the plurality of processing units listed in the instruction only execute tasks moved to the computationally bound task queue and do not execute other tasks that have not been moved to the computationally bound task queue.

15. A symmetric multiprocessing system adapted to allowing bounded processing, the system comprising:
   a plurality of processing units; and
   a memory including a set of instructions executable to cause the system to:
      identify a plurality of tasks to be scheduled for execution by the system;
      initially load all of the plurality of tasks to be scheduled into a symmetric multiprocessing task queue;
      form a computationally bound task queue;
      move selected ones of the plurality of tasks to be scheduled to the computationally bound task queue;
      bound the processing domain for the computationally bound task queue;
      assign tasks in the computationally bound task queue to execute on processing units in the processing domain bounded for the computationally bound task queue; and
      assign tasks in the symmetric multiprocessing task queue to execute on processing units not in the processing domain bounded for the computationally bound task queue.

16. The symmetric multiprocessing system recited in claim 15, wherein the set of instructions are included in an application programming interface.

17. The symmetric multiprocessing system recited in claim 16, the instructions executable to cause the system to bound the processing domain for a computationally bound task queue comprising instructions to:
   receive a listing of one or more of the plurality processing units; and
   receive a boundary relationship affining the computationally bound task queue to the one or more of the plurality of processing units listed in the listing.

18. The symmetric multiprocessing system recited in claim 16, the instructions executable to cause the system to bound the processing domain for a computationally bound task queue comprising instructions to:
   receive a listing of one or more of the plurality processing units; and
   receive a boundary relationship linking the computationally bound task queue to the one or more of the plurality of processing units listed in the listing.

* * * * *